May 27, 1958   C. VAN DER LELY ET AL   2,836,030
RAKING DEVICE
Filed May 18, 1953   3 Sheets-Sheet 1
FIG:1
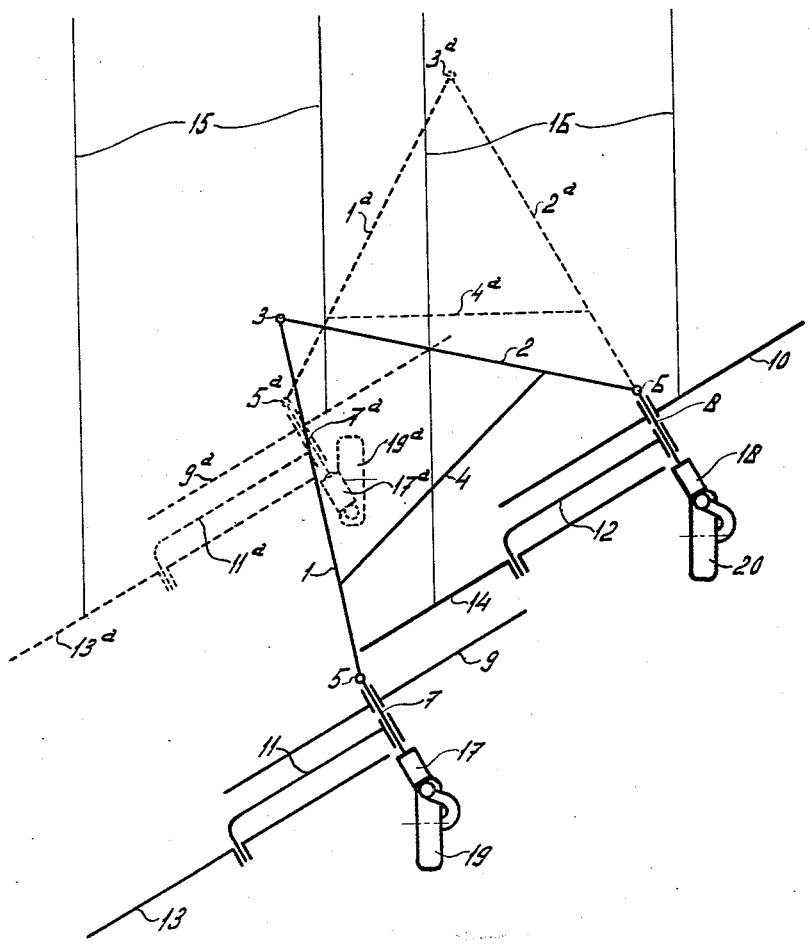

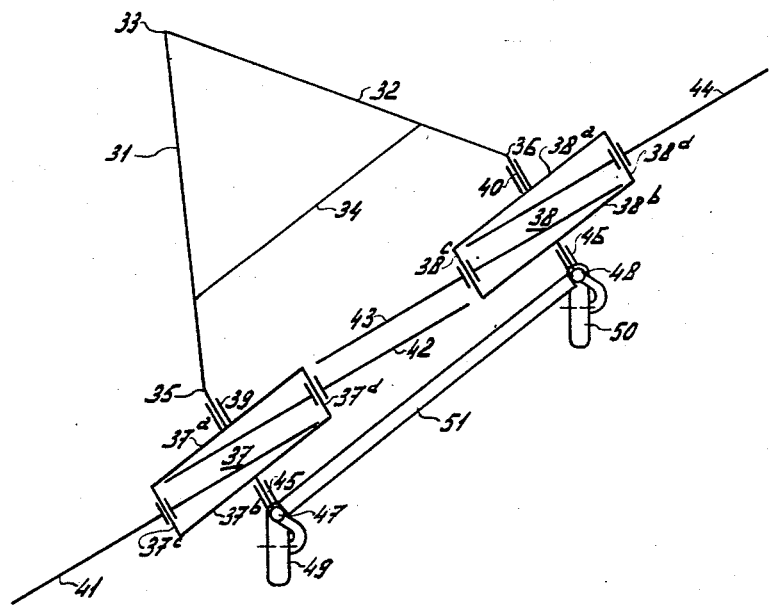
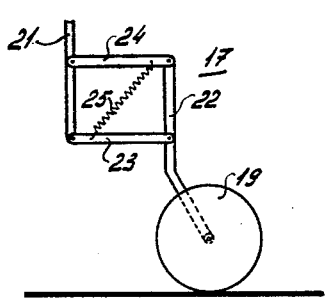
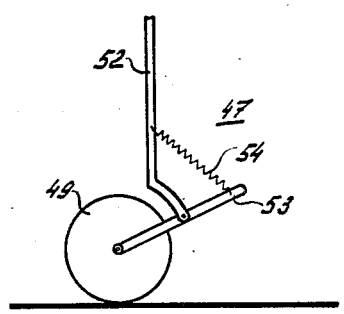

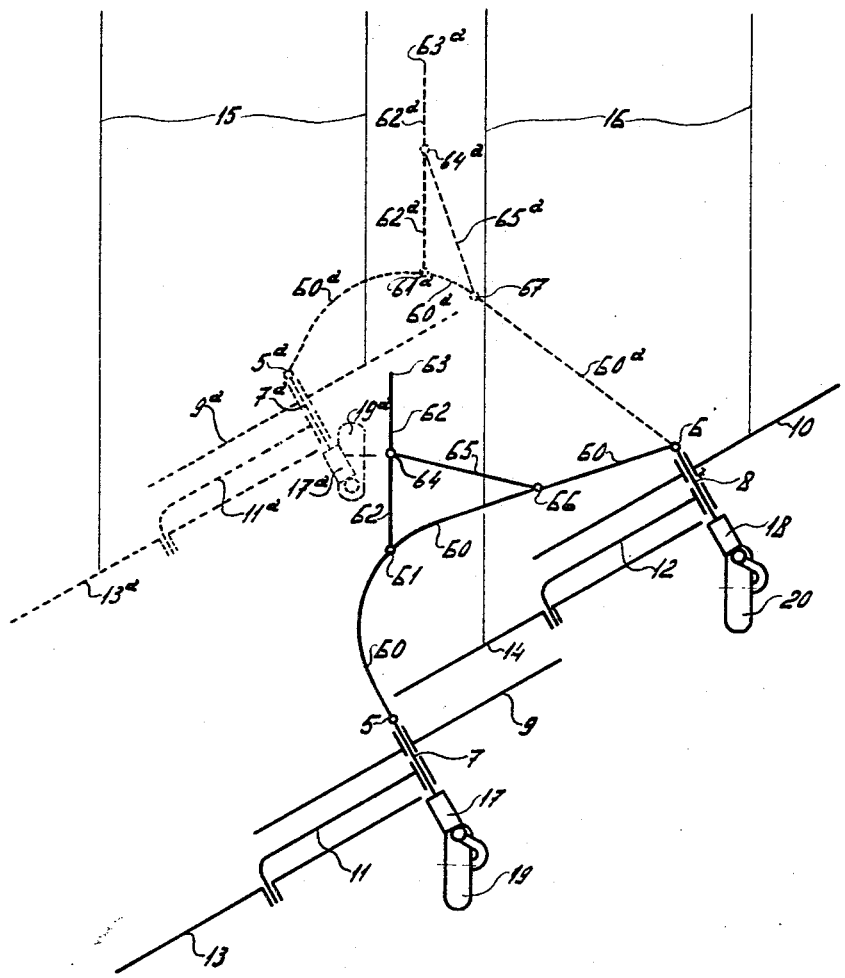

2,836,030
Patented May 27, 1958

2,836,030
RAKING DEVICE

Cornelis van der Lely and Ary van der Lely, Maasland, Netherlands, assignors to Cornelis van der Lely, Maasland, Netherlands Application May 18, 1953, Serial No. 355,595

Claims priority, application Netherlands May 20, 1952

16 Claims. (Cl. 56—377)

This invention relates to a raking device comprising a mobile frame, a number of running wheels or similar mobile supports for said frame and a plurality of rake wheels put into rotation by their coming into touch with the ground upon movement of said frame.

In known devices of this kind the rake wheels are rotatably mounted on a beam of the frame extending in oblique direction with regard to the direction of travel of the device, said beam being supported on the side that is turned away from the rake wheels by one or more running wheels. In order to obtain a rigid construction of the frame, said frame is provided with a number of connecting bows passing over and across the rake wheels.

It is an object of the present invention to provide a side delivery rake, swath turner or like raking device having a very simple and cheap frame structure in which the said connecting or bracing bows may be omitted. According to the invention a first mobile support is resiliently mounted on a bearing member extending through the hub of at least one of the rake wheels and a second mobile support spaced at a lateral distance from said first mobile support is likewise resiliently mounted on another bearing member extending through the hub of at least another of the rake wheels, said bearing members being secured to the mobile frame of the raking device on the side of the rake wheels that is turned away from the said mobile supports.

Another object of the invention is to carry out a bearing member as a bar extending through the hub of a rake wheel and to mount on said bar the one extremity of a rotatable crank arm carrying another rake wheel at its other extremity, so as to increase the number of rake wheels in a simple manner.

A further object of the present invention is to constitute a bearing member by a bearing frame having two parallel bars extending through two rake wheels and being connected to the mobile frame of the device so as to be rotatable about an axis parallel to and situated between the axes of said rake wheels.

Still further objects, features and details of the present invention will appear from the following description with reference to the accompanying drawings in which some preferred embodiments of the invention have been shown by way of example and in which:

Fig. 1 shows in plan view a side delivery rake which may be also used as a swath turner;

Fig. 2 is a side elevation of one of the resiliently mounted running wheels;

Fig. 3 is a plan view of a side delivery rake according to another embodiment;

Fig. 4 shows another embodiment of a resiliently mounted running wheel in side elevation; and Fig. 5 shows in plan view still another embodiment of the frame structure of the raking device.

Referring to Fig. 1 of the drawings, the mobile frame of the raking device comprises two bars or tubes 1 and 2 hingedly connected at 3 and united to a rigid triangle by means of a bar or tube 4. At the extremities 5 and 6 which are turned away from the hinge 3 bar-shaped bearing members, axles or frame elements 7 and 8 are hingedly connected to the frame bars 1 and 2, respectively, so as to be adjustable in the plane of the frame. Each of said bar-shaped bearing members 7 and 8 carries a rotatable rake wheel 9 and 10, respectively. Consequently the bearing members 7 and 8 extend in backward direction through the hubs of the rake wheels 9 and 10. Moreover, each of the members 7 and 8 carries a rotatable arm or crank 11 and 12, respectively, and upon the free extremity of each of said cranks 11, 12 is mounted an axle having mounted thereon rotatable rake wheels 13 and 14, respectively. Thus, according to Fig. 1 the raking device comprises in total four rake wheels 10, 14, 9 and 13 which are arranged in overlapping relation and are adapted to deliver the crop lying on the swaths 15 and 16 to the left hand side of the device.

The rear ends of the bearing members 7 and 8 are connected by means of spring devices 17 and 18, respectively, to a running wheel 19 respectively 20. If the side delivery rake is drawn forward in or near the hinge 3, at which point the device may be sustained, if desired by a third running wheel, the running wheel 20 may be a self-adjusting or swivel wheel, whereas the running wheel 19 may be locked in its position. In the manner described the mobile frame is substantially sustained in three points, the running wheels 19 and 20 carrying not only the major part of the frame, but also substantially the rake wheels, since the rake wheels 9 and 10, due to the spring devices 17 and 18, will only bear with a relatively small pressure upon the ground and the rake wheels 13 and 14 may be provided, if necessary, also with a suitable device reducing the wheel pressure on the ground.

It is advantageous that the running wheels 19 and 20 are situated behind the rake wheels, in order to avoid driving with said wheels over the crop lying on the ground. This has been rendered possible, because the bearing members 7 and 8 extending through the hubs of the rake wheels may be considered to form an integral part of the mobile frame of the device.

The spring device 17 shown in Fig. 2 comprises a vertical bar 21 which is connected to the bearing member 7 and a vertical bar 22 which carries the running wheel 19 and is adapted to turn about a vertical axis and to be locked in position. The bars 21 and 22 are interconnected by two parallel bars 23 and 24 having forked ends and constituting with the bars 21 and 22 a deformable parallelogram in which a spring 25 is mounted acting substantially in diagonal direction. Thus the wheel 19 is adapted to move in upward direction without taking the frame with it, whereby the parallelogram is deformed and the spring 25 stretched. The spring device 18 may be carried out in the same manner.

The side delivery rake shown in Fig. 1 may be used also as a swath turner, as has been indicated by dotted lines. The frame bars 1 and 2 will now take the positions 1a and 2a and the cross bar 4 has been replaced by a bar 4a of shorter length, so that the rear extremities 5a and 6 of the bars 1a and 2a are spaced apart at a shorter distance than the extremities 5 and 6 of the bars 1 and 2. After this transformation of the frame the rake wheels 10 and 14 will remain at their original places, whereas the rake wheels 9 and 13 will take new positions 9a and 13a, so as to be spaced from the rake wheels 10 and 14 at a distance corresponding to the distance between the swaths 15 and 16.

The relative position of the bearing members 7 and 8 to the frame bars 1 and 2 is changed by loosening the hinged connections 5 and 6 and locking them again in their new position (1a, 5a, 7a and 2a, 6, 8). The wheel 19 is turned about the vertical bar 22 by 180° so as to take the position 19a. Thus sufficient space will be formed between said wheel and the rake wheel 14, so as to permit the crop worked by the rake wheels 10 and 14 to pass freely therebetween.

The frame construction shown in Fig. 3 comprises two frame bars 31 and 32 having in front a common point 33, in the proximity of which the tractive force for the side delivery rake is applied, and being suitably braced by a cross bar 34. To the rear extremities 35 and 36 of the bars 31 and 32 two rake wheel bearing frames 37 and 38 are respectively connected by means of bearings 39 and 40 permitting movement of the frames 37 and 38 with regard to the vehicular frame about parallel axes. The bearings 39 and 40 are respectively connected to the middle of one of the longer frame members 37a and 38a of the frames 37 and 38. The shorter frame members 37c and 37d, respectively 38c and 38d of the frames 37 and 38 are carried through the hubs of rake wheels 41 and 42, respectively 43 and 44, said rake wheels being rotatable on axes which are parallel to the axes of the bearings 39 and 40. In alignment with the bearings 39 and 40 bearings 45 and 46, respectively, are provided, constituting a movable connection between the longer frame members 37b and 38b of the frames 37 and 38 and the resilient supporting devices 47 and 48, respectively, of the running wheels 49 and 50. In order to prevent tilting of the resilient supporting devices 47 and 48, said devices are interconnected by a rod 51. In this case the cross bar 34 may be omitted. However, the cross bar 34 is necessary, if the rod 51 is not provided and tilting of the devices 47 and 48 is prevented otherwise, e. g. by making use of pairs of running wheels. It will be understood that also in the device according to Fig. 1 the cross bar 4 could be replaced by a connecting rod between the spring devices 17 and 18.

Preferably the amplitude of the swinging movements of the rake wheel bearing frames 37 and 38 with regard to the vehicular frame is limited by the use of springs or resilient abutments.

The resilient supporting devices for the running wheels may be very simple in construction. In the embodiment shown in Fig. 4 the support 47 for the wheel 49 comprises a vertical bar 52 which is adapted to turn about a vertical axis and to be locked in position, said bar being hingedly connected, at a point situated aside of said axis, to a lever 53. One end of said lever 53 carries the wheel 49, whereas the other end is connected to the bar 52 by a spring 54.

In the embodiment shown in Fig. 5 the vehicular frame comprises a curved bar or tube 60, having hingedly connected to a point 61 thereof an arm 62, so as to permit swinging movement of said arm in the horizontal plane of the bar 60. The front extremity 63 serves to move the device forward. In order to permit adjustment of the arm 62 with regard to the bar 60, a point 64 of said arm is hingedly connected to a bracing arm 65. In the position as a side delivery rake shown in full lines in Fig. 5 the other end of the arm 65 is connected to a point 66 of the bar 60. In the position as a swath turner shown in dotted lines the arms 62 and 65 and the bar 60 will respectively take the positions 62a, 65a and 60a. However, the point of connection 67 between the arm 65a and the bar 60a is now situated at a distance from the hinge 61a which is shorter than the distance between the points 61 and 66.

The ends of the bar 60 are constituted by hinges 5 and 6 corresponding to the hinges 5 and 6 according to Fig. 1 and to which the same bearing members 7 and 8 carrying the rake wheels and the running wheels are connected. It will be understood that in the embodiment according to Fig. 5 the distance between the hinges 5 and 6 (position as a side delivery rake) or between the hinges 5a and 6 (position as a swath turner) remains unchanged. The front extremity 63 or 63a of the arm 62 or 62a is always situated between the swaths 15 and 16, so that a wheel provided in the proximity thereof does not run over the mown crop.

What we claim is:

1. A raking device comprising in combination a frame, a plurality of rake wheels borne by said frame and mounted for free rotation in parallel erect planes arranged at an acute angle to the line of travel of said frame, and ground engaging spring-mounted supports located behind rake wheels and constituting the principal means for supporting said frame on the ground during travelling, said frame being located with its principal elements at a lower elevation above the ground than the top portions of said rake wheels and said frame having certain frame elements extending through the hub of at least one of the rake wheels and being connected to one of the spring-mounted supports.

2. A raking device comprising in combination a frame, a plurality of rake wheels borne by said frame and mounted for free rotation in parallel erect planes arranged at an acute angle to the line of travel of said frame, so that said rake wheels are rotated by coming into contact with the terrain traversed, and ground engaging spring-mounted wheels located behind said rake wheels and constituting the principal running wheels for supporting said frame on the ground during travelling, said frame being located with its principal elements at a lower elevation above the ground than the top portions of said rake wheels and said frame having certain frame elements extending through the hub of at least one of the rake wheels and being connected to one of the spring-mounted running wheels.

3. A raking device according to claim 2, further comprising a crank arm carrying a rake wheel pivotally mounted upon each of the frame elements connected to a spring-mounted running wheel.

4. A raking device comprising in combination: a frame having a foremost portion and a hindmost portion, a plurality of rake wheels borne by said hindmost portion of the frame for free rotation in parallel erect planes arranged at an acute angle to the line of travel of said frame, so that said rake wheels are rotated by coming into contact with the terrain traversed, and ground engaging spring-mounted wheels located behind said rake wheels and constituting the principal running wheels for supporting said frame on the ground during travelling, said frame being located with the principal elements of its foremost portion and its hindmost portion at a lower elevation above the ground than the top portions of said rake wheels, the hindmost portion of the frame including frame elements extending through the hub of at least one of the rake wheels and being connected to one of the spring-mounted running wheels, each of said frame elements of the hindmost portion of the frame being pivotally connected to the foremost portion of said frame for adjustment about a vertical axis.

5. A raking device according to claim 4, wherein the foremost part of the frame is substantially in the shape of a rigid triangle, each of the two hindmost apexes of said triangle being connected to a frame element extending through the hub of a rake wheel.

6. A raking device according to claim 5, wherein each of the frame elements extending through the hub of a rake wheel is pivotally connected to one of the two hindmost apexes of the triangle for adjustment about a vertical axis.

7. A raking device according to claim 6, wherein the hindmost portion of the frame includes at least two substantially identical parallelograms arranged with two of their sides in parallel relationship, each of said two parallel sides carrying a rake wheel and the parallelogram being rotatable about an axis parallel to and situated between said parallel sides.

8. A raking device comprising in combination; a frame having a foremost portion and a hindmost portion, a plurality of rake wheels borne by said hindmost portion of the frame for free rotation in parallel erect planes arranged at an acute angle to the line of travel of said frame, so that said rake wheels are rotated by coming into contact with the ground traversed, and ground engaging spring-mounted wheels located behind said rake wheels and constituting the principal running wheels for supporting said frame on the ground during travelling, said frame being located with the principal elements of its foremost portion and its hindmost portion at a lower elevation above the ground than the top portions of said rake wheels, the hindmost portion of the frame including parallel frame elements each extending through the hub of a rake wheel and parallel frame elements each connected to one of the spring-mounted running wheels.

9. A rake comprising a frame having an axle extending substantially horizontally therefrom, a rake wheel journalled on said axle, an arm pivotally mounted on said axle and extending laterally therefrom, said arm having an axle on a terminal portion thereof substantially parallel to said first-mentioned axle, and to the rear thereof, and having a second raking wheel thereon and a spring loaded caster wheel connected to said first axle.

10. A rake comprising a frame having an axle extending substantially horizontally therefrom, a rake wheel journalled on said axle, an arm pivotally mounted on said axle and extending laterally therefrom, said arm having an axle on a terminal portion thereof substantially parallel to said first-mentioned axle, and to the rear thereof, and having a second raking wheel thereon and extending in a plane parallel to said first raking wheel and offset therefrom, whereby said first mentioned rake wheel engages the ground with less pressure then said second mentioned rake wheel, and a spring loaded caster wheel connected to said first axle.

11. A rake comprising a frame lying in a single plane, said frame having a means for applying traction, a series of side delivery rake wheels arranged in echelon on said frame, a plurality of supporting wheels on said frame on the side of said rake wheels which is opposite to said means for applying traction, said frame extending through at least two of said rake wheels.

12. A rake comprising a substantially uniplanar frame having a means for applying traction thereto, at least two side delivery rake wheels arranged in echelon on said frame opposite to said means for applying traction, at least two supporting wheels for said frame, and frame parts interconnecting said frame and said supporting wheels, at least one of said supporting wheels being spaced outwardly of said rake wheels from said frame.

13. A side delivery rake comprising a substantially uniplanar frame having a means for applying traction thereto, a row of at least two side delivery rake wheels arranged in an echelon on said frame, at least two supporting wheels for said frame, and frame parts interconnecting said frame and said supporting wheels, at least one of said supporting wheels being on the side of said rake wheels which is opposite to said means for applying traction, said latter supporting wheel being interconnected to said means for applying traction by a said frame part extending from said frame through said row of rake wheels.

14. A side delivery rake as claimed in claim 13 wherein each rake wheel is pivotally connected to said frame by an arm means.

15. A side delivery rake as claimed in claim 13 wherein said rake wheel is freely rotatable on an axle.

16. A side delivery rake as claimed in claim 15 wherein said axle of each rake wheel is pivotally connected to said frame by an arm means.

References Cited in the file of this patent

UNITED STATES PATENTS

| | | |
|---|---|---|
| 828,571 | Rodemeyer | Aug. 14, 1906 |
| 1,167,122 | Simmons | Jan 4, 1916 |
| 2,459,961 | Pollard | Jan. 25, 1949 |
| 2,481,995 | Godley | Sept. 13, 1949 |
| 2,657,519 | Hill | Nov. 3, 1953 |

FOREIGN PATENTS

| | | |
|---|---|---|
| 17,636 | Great Britain | Oct. 4, 1900 |
| 4,788 | Great Britain | 1904 |